United States Patent
Tatangelo et al.

(10) Patent No.: US 10,151,390 B2
(45) Date of Patent: Dec. 11, 2018

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventors: Joseph William Tatangelo, Wolverine Lake, MI (US); Paul G. Otanez, Franklin, MI (US); Zhen J. Zhang, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 512 days.

(21) Appl. No.: 14/935,580

(22) Filed: Nov. 9, 2015

(65) Prior Publication Data

US 2017/0130836 A1    May 11, 2017

(51) Int. Cl.
*F16H 61/66* (2006.01)
*F16H 61/662* (2006.01)
*F16H 61/00* (2006.01)

(52) U.S. Cl.
CPC ........... *F16H 61/66272* (2013.01); *F16H 2061/0078* (2013.01); *F16H 2061/66277* (2013.01)

(58) Field of Classification Search
CPC .............. F16H 59/72; F16H 61/66272; F16H 61/6649; F16H 2061/0078; F16H 2061/66277
See application file for complete search history.

(56) References Cited

U.S. PATENT DOCUMENTS

| | | | |
|---|---|---|---|
| 6,460,398 B1 * | 10/2002 | Stopp | F16H 59/46 474/18 |
| 8,485,931 B1 | 7/2013 | Whitmarsh | |
| 9,127,750 B2 * | 9/2015 | Nishida | F16H 61/66272 |
| 9,285,031 B1 * | 3/2016 | Otanez | F16H 61/66259 |
| 2004/0063523 A1 * | 4/2004 | Jozaki | F16H 66/66272 474/18 |
| 2004/0127330 A1 * | 7/2004 | Sawada | F16H 61/66259 477/44 |
| 2007/0082771 A1 * | 4/2007 | Izumi | F16H 61/66272 474/18 |

(Continued)

FOREIGN PATENT DOCUMENTS

| | | |
|---|---|---|
| CN | 103363103 A | 10/2013 |
| CN | 103808507 A | 5/2014 |
| JP | 2015513643 A | 5/2015 |

*Primary Examiner* — Ramya P Burgess
*Assistant Examiner* — David R Morris
(74) *Attorney, Agent, or Firm* — Quinn IP Law (57) ABSTRACT

A method and apparatus for controlling a continuously variable transmission (CVT) of a powertrain system includes determining a target clamping pressure and an actual clamping pressure, and determining a proportional correction term and an integral correction term based upon the target clamping pressure and the actual clamping pressure. An adapt correction term is determined based upon the target clamping pressure and a temperature of the CVT. A commanded clamping pressure for controlling the CVT is determined based upon the proportional correction term, the integral correction term and the adapt correction term. A pressure command is employed to drive an actuator of a moveable sheave of a pulley of a variator of the CVT based upon the commanded clamping pressure.

12 Claims, 4 Drawing Sheets

(56) References Cited

U.S. PATENT DOCUMENTS

| | | |
|---|---|---|
| 2012/0090937 A1 | 4/2012 | Samie et al. |
| 2012/0323457 A1* | 12/2012 | Nakamura .......... F16H 61/0021 701/59 |
| 2013/0130863 A1 | 5/2013 | Xu et al. |
| 2014/0074366 A1 | 3/2014 | Cui et al. |
| 2014/0357443 A1 | 12/2014 | Monteiro De Lima |
| 2015/0148158 A1* | 5/2015 | Nishida ............. F16H 61/66272 474/28 |
| 2016/0017993 A1* | 1/2016 | Yagasaki .......... F16H 61/66272 701/58 |

\* cited by examiner

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of operating at input/output speed ratios that are infinitely variable over a range between a minimum (underdrive) ratio and a maximum (overdrive) ratio, thus permitting selection of engine operation that achieves a preferred balance of fuel consumption and engine performance in response to an operator torque request. The capability of providing infinitely variable input/output speed ratios distinguishes a CVT from a step-gear transmission, which includes a plurality of fixed gear ratios that may be engaged in a stepwise manner in response to an output torque request.

Known chain-type CVTs include two pulleys, each having two sheaves. A chain runs between the two pulleys, with the two sheaves of each of the pulleys sandwiching the chain therebetween. Frictional engagement between the sheaves of each pulley and the chain couples the chain to each of the pulleys to transfer torque from one pulley to the other. One of the pulleys may operate as a drive or input pulley, and the other pulley may operate as a driven or output pulley. The gear ratio is the ratio of the torque of the driven pulley to the torque of the drive pulley. The gear ratio may be changed by urging the two sheaves of one of the pulleys closer together and urging the two sheaves of the other pulley farther apart from each other, causing the chain to ride higher or lower on the respective pulley.

SUMMARY

A powertrain system including a continuously variable transmission (CVT) is described. A method for controlling the CVT includes determining a target clamping pressure and an actual clamping pressure, and determining a proportional correction term and an integral correction term based upon the target clamping pressure and the actual clamping pressure. An adapt correction term is determined based upon the target clamping pressure and a temperature of the CVT. A commanded clamping pressure for controlling the CVT is determined based upon the proportional correction term, the integral correction term and the adapt correction term. A pressure command is employed to drive an actuator of a moveable sheave of a pulley of a variator of the CVT based upon the commanded clamping pressure.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
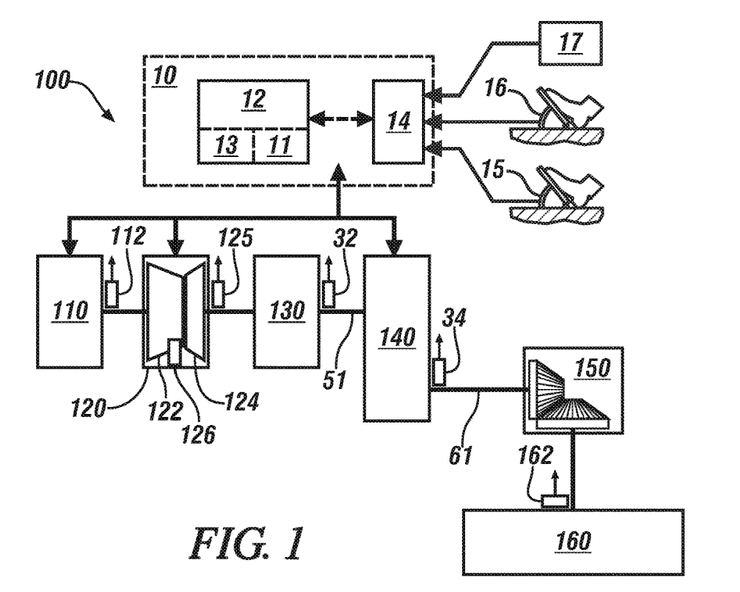
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes an internal combustion engine (engine) 110 rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing fluidic coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162, through which vehicle speed (Vss) is monitored. Each of the aforementioned speed sensors may be any suitable rotation position/speed sensing device, such as a Hall-effect sensor. Each of the aforementioned speed sensors communicates with the control system 10.

The control system 10 preferably includes one or a plurality of controllers 12 and a user interface 14. A single controller 12 is shown for ease of illustration. The controller 12 may include a plurality of controller devices, wherein each of the controllers 12 is associated with monitoring and controlling a single system. This may include an engine control module (ECM) for controlling the engine 110, and a transmission controller (TCM) for controlling the CVT 140 and monitoring and controlling a single subsystem, e.g., a torque converter clutch. The controller 12 preferably includes a memory device 11 containing executable instruction sets and a memory cache 13. The user interface 14 communicates with operator input devices including, e.g., an accelerator pedal 15, a brake pedal 16 and a transmission gear selector 17. In one embodiment, the transmission gear selector 17 includes a tap-up/tap-down feature, whereby a vehicle operator may manually select a transmission gear ratio and override transmission control. A tap-up command results in a command to the CVT 140 to increase its gear ratio, which is accomplished by increasing a variator speed ratio. A tap-down command results in a command to the CVT 140 to decrease its gear ratio by decreasing the variator speed ratio.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory and storage devices (read only, programmable read only, random access, hard drive, etc.), including the memory cache 13. The memory cache 13 is preferably is configured as a non-volatile memory device having programmable read/write capabilities, which facilitates storage of data arrays for retrieval over off/on power cycles, as may occur in conjunction with vehicle key-off/key-on events. The non-transitory memory component(s) is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

Figure 2:
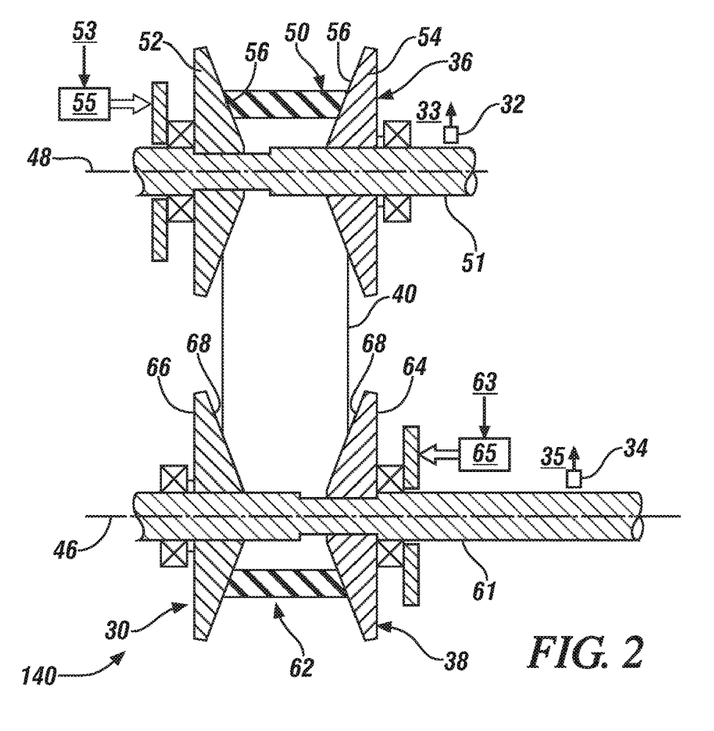
FIG. 2 is a schematic cross-sectional illustration of elements of a variator of a chain-type CVT, in accordance with the disclosure.

FIG. 2 schematically illustrates elements of a variator 30 of a chain-type continuously variable transmission (CVT) 140 that may be advantageously controlled by the controller 12. The variator 30 transfers torque between the first rotating member 51 and the second rotating member 61. The first rotating member 51 is nominally referred to herein as input member 51, and the second rotating member 61 is nominally referred to herein as output member 61.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device. The input speed sensor 32 may be mounted near the input member 51 to generate a CVT input speed 33 that relates to a speed of the first, input pulley 36, and the output speed sensor 34 may be mounted near the output member 61 to generate a CVT output speed 35 that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque therebetween. As used herein, the term 'speed ratio' refers to a variator speed ratio, which is a ratio of a CVT input speed and a CVT output speed. The CVT input speed may be determined based upon a signal input from one of the engine speed sensor 112, the torque converter turbine speed sensor 125, or the input speed sensor 32, as described herein, or another suitable speed/position sensor. The CVT output speed may be determined based upon a signal input from the output speed sensor 34 or the wheel speed sensor 162 as described herein, or another suitable speed/position sensor.

The speed ratio parameters are determined based upon the CVT input speed and the CVT output speed.

The first pulley 36 is split perpendicular to the first axis 48 to define an annular first groove 50 that is formed between a first moveable sheave 52 and a first stationary sheave 54. The first moveable sheave 52 axially moves or translates along the first axis 48 relative to the first stationary sheave 54. For example, the first moveable sheave 52 may be attached to the input member 51 via a splined connection, thereby allowing axial movement of the first moveable sheave 52 along the first axis 48. The first stationary sheave 54 is disposed opposite the first moveable sheave 52. The first stationary sheave 54 is axially fixed to the input member 51 along the first axis 48. As such, the first stationary sheave 54 does not move in the axial direction of the first axis 48. The first moveable sheave 52 and the first stationary sheave 54 each include a first groove surface 56. The first groove surfaces 56 of the first moveable sheave 52 and the first stationary sheave 54 are disposed opposite each other to define the annular first groove 50 therebetween. The opposed first grooved surfaces 56 preferably form an inverted frustoconical shape such that a movement of the first moveable sheave 52 towards the first stationary sheave 54 increases an outer pulley diameter of the annular first groove 50. A first actuator 55 is arranged with the first pulley 36 to control an axial position of the first moveable sheave 52 in response to a drive signal 53, including urging the first moveable sheave 52 towards the first stationary sheave 54. In one embodiment, the first actuator 55 is a hydraulically-controlled device and the drive signal 53 is a hydraulic pressure signal.

The second pulley 38 is split perpendicular to the second axis 46 to define an annular second groove 62 therebetween. The annular second groove 62 is disposed perpendicular to the second axis 46. The second pulley 38 includes a second moveable sheave 64 and a second stationary sheave 66. The second moveable sheave 64 axially moves or translates along the second axis 46 relative to the stationary sheave 66. For example, the second moveable sheave 64 may be attached to the output member 61 via a splined connection, thereby allowing axial movement of the second moveable sheave 64 along the second axis 46. The second stationary sheave 66 is disposed opposite the second moveable sheave 64. The second stationary sheave 66 is axially fixed to the output member 61 along the second axis 46. As such, the second stationary sheave 66 does not move in the axial direction of the second axis 46. The second moveable sheave 64 and the second stationary sheave 66 each include a second groove surface 68. The second groove surfaces 68 of the second moveable sheave 64 and the second stationary sheave 66 are disposed opposite each other to define the annular second groove 62 therebetween. The opposed second grooved surfaces 68 preferably form an inverted frustoconical shape such that a movement of the second moveable sheave 64 towards the second stationary sheave 66 increases an outer pulley diameter of the annular second groove 62. A second actuator 65 is arranged with the second pulley 38 to control an axial position of the second moveable sheave 64 in response to a driven signal 63, including urging the second moveable sheave 64 towards the second stationary sheave 66. In one embodiment, the second actuator 65 is a hydraulically-controlled device and the driven signal 63 is a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

The variator speed ratio is a ratio of the speed of the input member 51 in relation to the speed of the output member 61. An actual speed ratio indicates a present, measured value for the speed ratio, and may be determined based upon a ratio of the input speed signal 33 and the output speed signal 35. A desired speed ratio indicates a commanded, future value for the speed ratio, which may be determined based upon monitored and estimated operating conditions related to an output power command, vehicle speed, engine torque, and other factors. The controller 12 executes control routines to control the CVT 140 to achieve the desired speed ratio by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired speed ratio, wherein the requisite pressures are preferably in the form of a primary pressure command and a secondary pressure command.

During operation, pulley clamping force must be sufficient to avoid chain slip conditions. To avoid chain slip, a safety factor is applied to a minimum pulley clamping force, resulting in a larger clamping force, which commands higher fluidic pressure, with associated increase in pumping losses and attend effect upon fuel consumption. Furthermore, there may be variation in pressure error between vehicles due to production variation and change over time, and under different operating conditions, such as CVT operating temperature. Thus, a process for learning and accommodating pressure error variation minimizes the need for larger initial clamping forces, and increases control accuracy. Pressure control stability and transmission responsiveness are affected by the pressure error variation.

Figure 3:
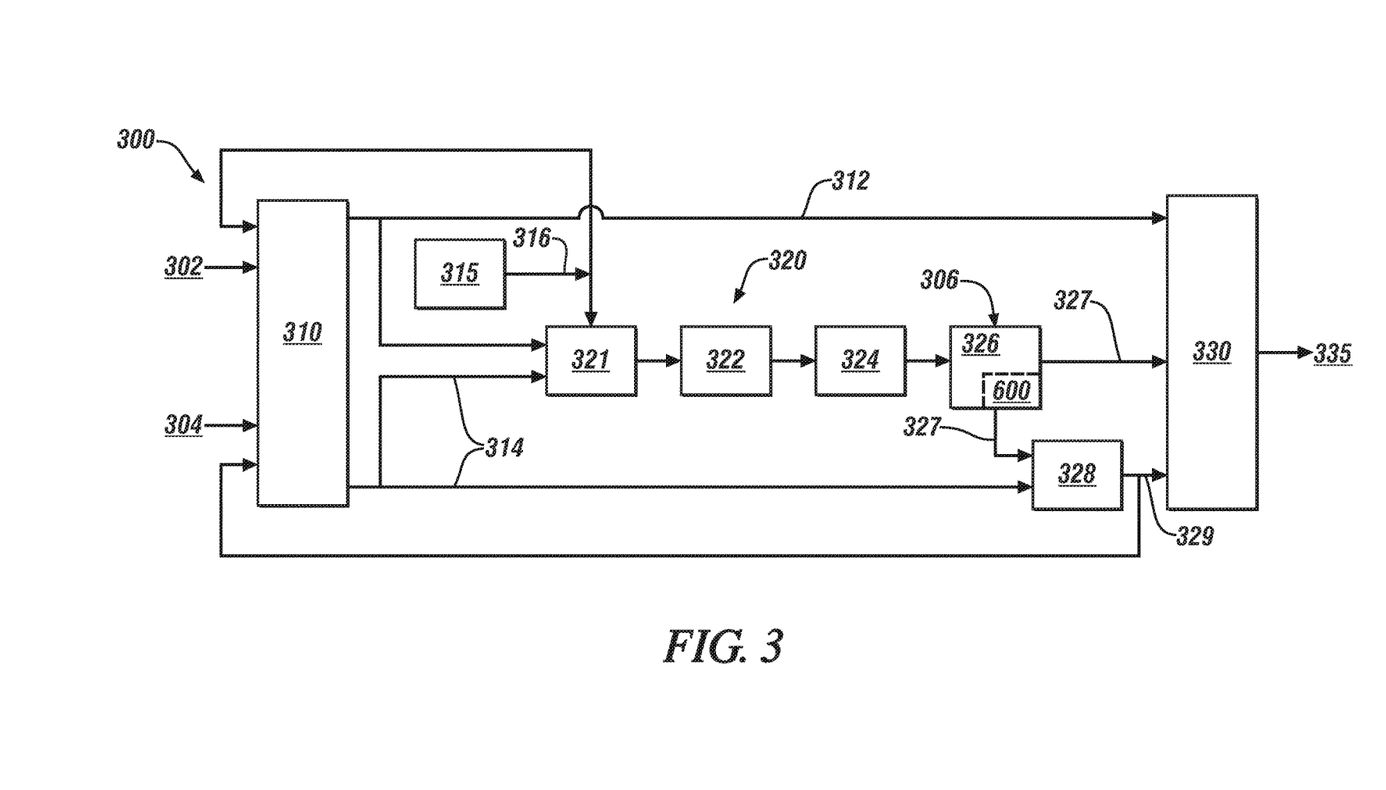
FIG. 3 schematically shows a block diagram of a pressure control and error adaptation routine to control damping pulley pressure in a variator of an embodiment of the CVT and the powertrain system shown with reference to FIGS. 1 and 2, in accordance with the disclosure.

FIG. 3 schematically shows a block diagram of a pressure control and error adaptation routine (routine) 300 that may advantageously control damping pulley pressure in an embodiment of the CVT 140 that is employed in an embodiment of the powertrain system 100 shown with reference to FIGS. 1 and 2 to improve pressure control stability and improve responsiveness of the CVT 140 to changes in output torque requests. Overall, the routine 300 includes a closed loop pulley pressure control routine 310, an adapt routine 320, and a summing routine 330 that execute to determine a final clamping pressure command 335. The final clamping pressure command 335 is a pressure command to drive an actuator of a moveable sheave of one of the first and second pulleys 36, 38 of the variator 30 of the CVT 140 based upon inputs of a target pulley pressure 302 and an actual pulley pressure 304. As previously indicated, either of the first and second pulleys 36, 38 may act as a clamping pulley.

The target pulley pressure 302 is a pulley clamping pressure to control the CVT 140 to a preferred operating point, e.g., a preferred speed ratio, as part of controlling the powertrain system 100 to generate torque in response to an output torque request, e.g., from an operator input to the accelerator pedal 15 and/or the brake pedal 16. The actual pulley pressure 304 is based upon a signal input indicating actual pressure exerted on the primary pulley or the secondary pulley, and may be based upon a signal from a pressure sensor arranged to monitor the pulley pressure, or may be based upon other signals, e.g., signals 33, 35 from the rotational speed sensors 32, 34.

The closed loop pulley pressure control routine 310 determines a proportional pressure command 312 and an integral pressure command 314 based upon the target pulley pressure 302 and the actual pulley pressure 304. The proportional pressure command 312 is preferably determined based upon an arithmetic difference between the present target pulley pressure 302 and the present actual pulley pressure 304, which may be multiplied by a scalar. The integral pressure command 314 is preferably determined based upon differences between the target pulley pressure 302 and a corresponding actual pulley pressure 304 that have been accumulated for a period of time.

Figure 4:
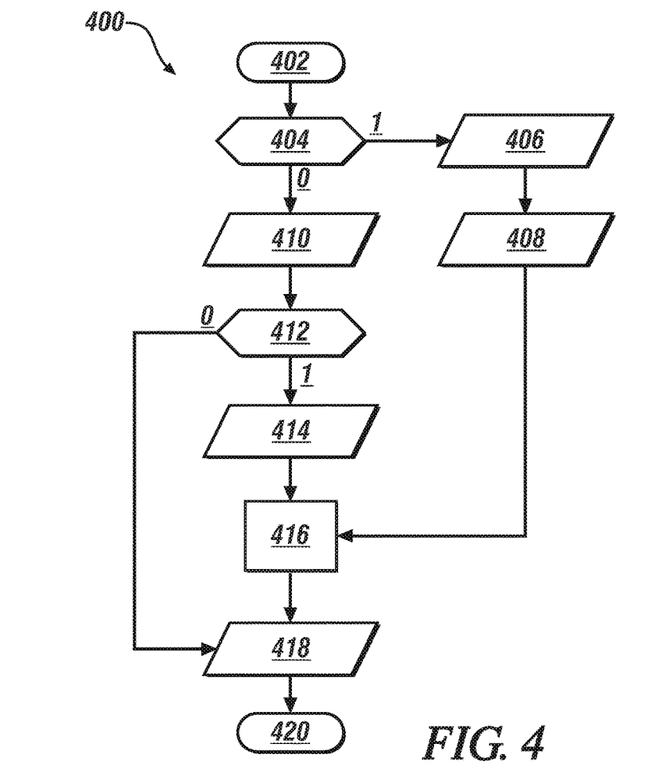
FIG. 4 schematically shows operation of a pressure control routine including execution of the closed loop pulley pressure control routine and the summing routine to control clamping pulley pressure when the adapt routine is not updating one or more cells.

FIG. 4 schematically shows operation of a pressure control routine 400 associated with operation of the routine 300 that includes execution of the closed loop pulley pressure control routine 310 and the summing routine 330 when the adapt routine 320 is not updating one or more cells. Table 1 is provided as a key wherein the numerically labeled blocks and the corresponding functions are set forth as follows.

TABLE 1

| BLOCK | BLOCK CONTENTS |
|---|---|
| 402 | Initiate iteration; determine proportional term, integral term and adapt correction term |
| 404 | Has adapt correction term in lookup table been modified? |
| 406 | Set remaining integral to adapt term equal to difference between integral term and change in adapt correction term due to modification |
| 408 | Set integral reset value equal to remaining integral term |
| 410 | Set remaining integral to adapt term equal to integral term |
| 412 | Is integral reset desired? |
| 414 | Set integral reset value equal to zero |
| 416 | Reset integral |
| 418 | Set pulley pressure command equal to proportional term plus remaining integral to adapt term plus adapt correction term |
| 420 | End |

The routine 400 periodically executes, and each iteration (402) determines a proportional term, i.e., the proportional pressure command 312, an integral term, i.e., the integral pressure command 314, and an adapt correction term 327. An example adapt lookup table 600 is shown and described with reference to FIG. 6, including a plurality of cells containing states for an adapt correction term 327 that may be selected based upon the commanded pulley pressure and CVT temperature. The adapt correction term 327 in each of the plurality of cells may be modified by the adapt routine 320, as described herein. The routine 400 determines whether the adapt correction term in the adapt lookup table has been modified (404). When the adapt correction term in the adapt lookup table has been modified (404)(1), a remaining integral to adapt term is set equal to a difference between the integral term, i.e., the integral pressure command 314, and a change in the adapt correction term due to the modification (406), and an integral reset value is set equal to the remaining integral term (408). When the adapt correction term in the adapt lookup table has not been modified (404)(0), the remaining integral to adapt term is set equal the integral term, i.e., the integral pressure command 314 (410), and it is determined whether there is a desire or request to reset the integral term (412). If so (412)(1), an integral reset value is set equal to zero (414), and the integral term is reset (416). If there is no desire or request to reset the integral term (412)(0), or after the integral term is reset (416), the pulley pressure command, i.e., the final clamping pressure command 335, is set equal to a proportional term, i.e., the proportional pressure command 312 plus the remaining integral to adapt term plus the adapt correction term, i.e., correction term 327.

Figure 6:
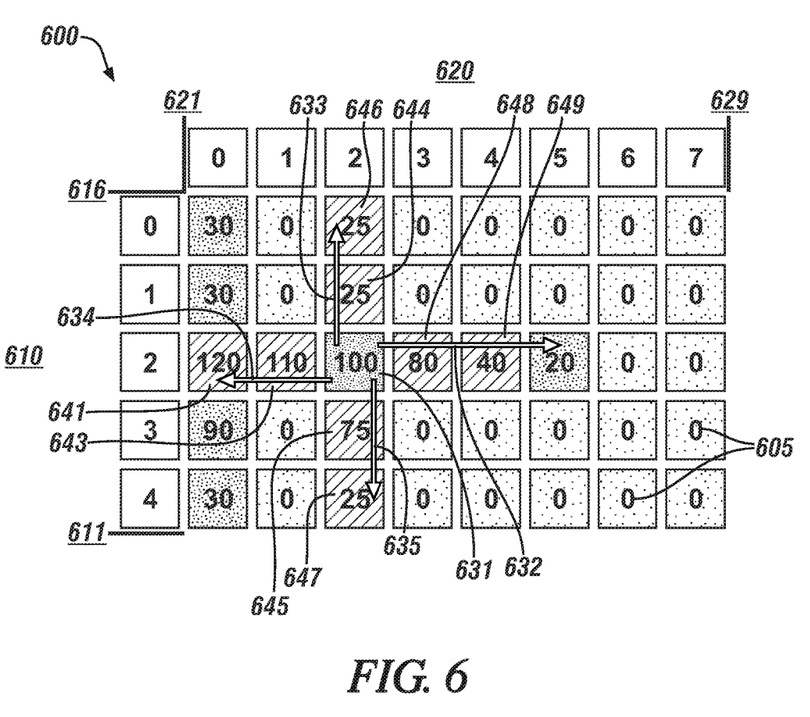
FIG. 6 schematically shows an example of the adapt lookup table that includes a plurality of cells storing states for an adapt correction term, wherein each cell corresponds to a pulley pressure range and a CVT temperature range, in accordance with the disclosure.

FIG. 6 schematically shows an example of the adapt lookup table 600 that includes a plurality of cells 605 storing states for the adapt correction term 327, wherein each cell corresponds to a pulley pressure range 610 shown on a horizontal axis, and a CVT temperature range 620 shown on a vertical axis. The adapt lookup table 600 may be stored as an array in the memory cache 13 of the controller 12. The pulley pressure 610 traverses between a minimum pulley pressure 611 and a maximum pulley pressure 616, and is preferably subdivided into a plurality of pressure ranges. Five pressure ranges are shown, but the number of pressure ranges may be calibrated to any suitable quantity. In one embodiment, the pressure ranges have equal magnitudes. However, the magnitudes of individual pressure ranges may vary in some embodiments. The CVT temperature 620 traverses between a minimum CVT temperature 621 and a maximum CVT temperature 629, and is preferably subdivided into a plurality of temperature ranges. Eight temperature ranges are shown between a minimum temperature, e.g., −40° C., and a maximum temperature, e.g., 150° C., but the number of temperature ranges may be calibrated to any suitable quantity. In one embodiment, the temperature ranges have equal magnitudes. However, the magnitudes of individual temperature ranges may vary in some embodiments. Cells 605 are formed within each paired ranges of temperature 620 and pressure 610, and a state for the adapt correction term 327 is stored within each of the cells 605. Under certain conditions, the adapt routine 320 determines the adapt correction term 327 based upon the target pulley pressure 302 and the CVT temperature 306. In such instances, the adapt routine 320 retrieves a state for the adapt correction term 327 stored in one of the cells 605 of the adapt lookup table 600 based upon the target pulley pressure 302 and the CVT temperature 306, and employs it as described.

Under other conditions, the adapt routine 320 modifies one or more of the states for the adapt correction term 327 contained in one of the cells 605 of the adapt lookup table 600 in response to an adapt trigger signal 316 from an adapt trigger routine 315. The adapt trigger routine 315 may decide to modify one of the cells of the adapt lookup table 600 based upon factors related to proximity of present operating conditions to cells in the adapt lookup table 600, a calibrated trigger frequency, a torque capacity ratio stability, the commanded pressure 302, the CVT temperature 306, a commanded pressure stability, a commanded ratio stability, a real ratio stability, line pressure stability, clamping pulley status, binary pump mode operation, and system diagnostics.

Referring again to FIG. 3, the adapt routine 320 employs the proportional pressure command 312 and the integral pressure command 314 to determine and update the adapt correction term 327. A remainder routine 328 determines a remainder pressure command 329 based upon a difference between the adapt correction term 327 and the integral pressure command 314. The summing routine 330 combines the proportional pressure command 312, the adapt correction term 327 and the remainder pressure command 329 to determine the final pressure command 335, and the remainder pressure command 329 is provided as feedback to the closed loop pulley pressure control routine 310.

The adapt routine 320 executes in response to the adapt trigger signal 316 from the adapt trigger routine 315, and includes an adapt convergence routine 321, an adapt prediction routine 322, an adapt learn distribution term 324 and an adapt lookup routine 326 to determine the adapt correction term 327. The adapt convergence routine 321 determines cell convergence for one of the adapt correction terms 327 stored in one of the cells 605 of the adapt lookup table 600. Convergence of the adapt correction term 327 stored in a targeted one of the cells 605 may be achieved when both the target pulley pressure 302 and the CVT temperature 306 are within calibrated limits for the target cell, the measured pulley pressure is within a calibrated tolerance of the commanded pulley pressure, and the closed loop proportional and integral terms remain less than calibrated thresholds for a calibrated period of time.

Figure 5:
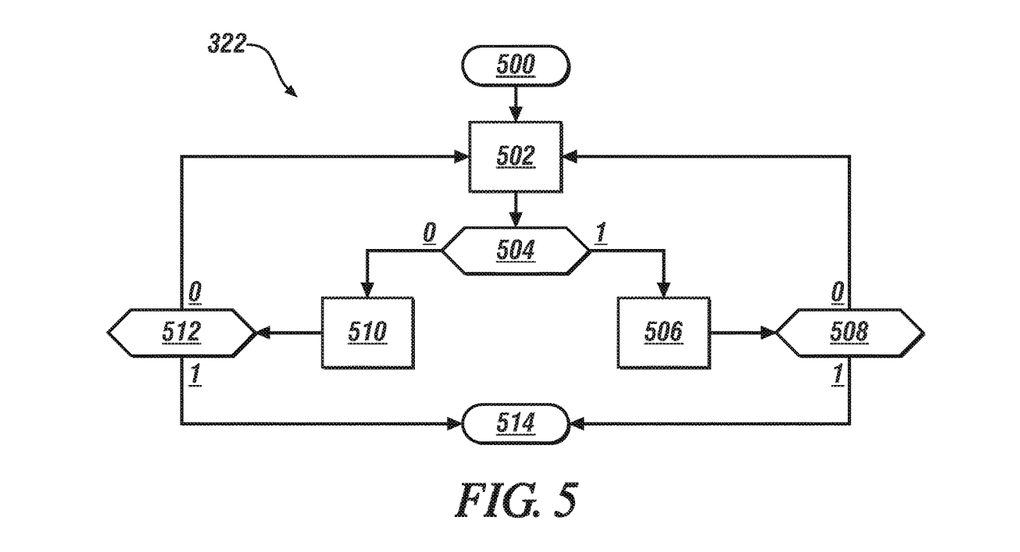
FIG. 5 schematically shows an embodiment of an adapt prediction routine, in accordance with the disclosure.

FIG. 5 schematically shows an embodiment of the adapt prediction routine 322. The adapt prediction routine 322 executes to predict states of adapt correction terms stored in adjacent cells in the adapt lookup table 600 when the selected adapt correction term that is stored in one of the cells of the adapt lookup table 600 converges. Cells in both directions of each of the axes within a calibrated range are candidates for adapt prediction, wherein the axes include the pulley pressure range 610 shown on the horizontal axis and the CVT temperature range 620 shown on the vertical axis. As such, the adapt prediction routine 322 is a function of convergence status of nearby cells. Table 2 is provided as a key wherein the numerically labeled blocks and the corresponding functions are set forth as follows.

TABLE 2

| BLOCK | BLOCK CONTENTS |
|---|---|
| 500 | Initiate adapt prediction routine |
| 502 | Select axis, direction of search: +X, −X, +Y, −Y from newly converged cell |
| 504 | Is a converged cell in vicinity? |
| 506 | Interpolate non-converged cells between newly converged cell and converged cell in vicinity |
| 508 | Apply decay function to neighboring cells |
| 510 | Search prediction in all directions? |
| 512 | Search prediction in all directions? |
| 514 | End |

The adapt prediction routine 322 executes when one of the cells of the adapt lookup table 600 converges (500). The adapt prediction routine 322 selects one of the axes and a direction of search, i.e., either positive (+) or negative (−), in relation to the newly converged cell (502). Referring to FIG. 6, and by way of example, cell 631 may be a recently converged cell, and the axes may include the pulley pressure range 610 shown on the horizontal axis, and the CVT temperature range 620 shown on the vertical axis. The directions of search include the increasing pulley pressure range 610 (+X) 633, the decreasing pulley pressure range 610 (−X) 635, the increasing CVT temperature range 620 (+Y) 632, and the decreasing CVT temperature range (−Y) 634.

Referring again to FIG. 5, the adapt prediction routine 322 determines whether there is a previously converged cell in the vicinity of the selected direction of search (504)(1), and linearly interpolates between the newly converged cell and the previously converged cell in the vicinity to determine predicted adapt correction term(s) 327 for any non-converged cells (506). The adapt prediction routine 322 determines whether there has been a search prediction for both axes 610, 620 and both directions (+) and (−) (508), and if not (508)(0), returns to continue the search (504), or otherwise (508)(1) completes the search (514).

Referring to FIG. 6, and by way of example, cell 631 may be a recently converged cell, cell 641 may be a previously converged cell in the decreasing CVT temperature range (−Y) 634, and cell 643 may be an intervening non-converged cell. Thus, if cell 641 has a state of 100 and cell 641 has a state of 120, and cell 643 is a single intervening non-converged cell, the adapt prediction routine 322 assigns a state of (120+100)/2=110 to cell 643 in step 506.

Referring again to FIG. 5, when the adapt prediction routine 322 determines whether there has not been a previously converged cell in the vicinity of the selected direction of search (504)(0), a decay function is applied to cells that are neighboring the newly converged cell (508). In one embodiment, the decay function may be expressed as an array, e.g., {75%, 25%, 0%}, wherein the array terms are applied to the state of a newly converged cell based upon proximity to the newly converged cell and an existing state of the cell in consideration. Thus, a cell having an existing state of zero that is adjacent to the newly converged cell is assigned a state that is 75% of the state of the newly converged cell, a cell that is one cell removed from the newly converged cell is assigned a state that is 25% of the state of the newly converged cell, and a cell that is two cells removed from the newly converged cell is assigned a state that is 0% of the state of the newly converged cell. Similarly, a cell having a present state of M that is adjacent to the newly converged cell is assigned a state that is 75% of the state of the newly converged cell plus 25% of the existing state of M. A cell that is one cell removed from the newly converged cell is assigned a state that is 25% of the state of the newly converged cell plus 75% of the existing state of M.

Referring to FIG. 6, and by way of example, cell 631 is the recently converged cell, and there are no previously converged cells in the increasing pulley pressure range 610 (+X) 633, the decreasing pulley pressure range 610 (−X) 635, or the increasing CVT temperature range 620 (+Y) 632. If cell 641 has a newly assigned state of 100, cells 644, 645 that are adjacent to the cell 641 and have existing states of zero will both be assigned states of 75, cell 648 that is adjacent to the cell 641 and has an existing state of 20 will be assigned a state of ((75%*100)+(25%*20))=80, and cell 649 that is once-removed from the cell 641 and has an existing state of 20 will be assigned a state of ((25%*100)+(75%*20))=20.

Referring again to FIG. 5, the adapt prediction routine 322 determines whether there has been a search prediction for both axes 610, 620 and both directions (+) and (−) (512), and if not (512)(0), returns to continue the search (504), or otherwise (512)(1) completes the search (514). The adapt prediction routine 322 may also execute a search prediction to update states of cells that are diagonal to the newly converged cell employing similar methodologies as described herein.

Referring again to FIG. 3, the adapt learn distribution term 324 is a modification that is a function of proximity to breakpoints of neighboring cells. This may include a proximity gain search, wherein upper and lower level proximity gains are established for each axis based upon a relative proximity to the respective breakpoint. Each of the four neighboring adapt cells calculate their individual proximity gain as the product of their respective gains for each axis. The total desired adapt modification will be scaled for each cell with the respective proximity gain. This scaled amount will then be applied to the existing adapt value without overshooting the total desired error to learn.

Another approach for learning cells in the two dimensional adaptive lookup table 600 includes modifying the pressure command to align with lookup table breakpoints. Pressure modification is performed primarily for non-converged adapt cells. Modification of converged cells only occurs when the commanded pressure and system temperature is within calibrated limits of the adapt cell in question. Inhibiting modification when operating conditions are distant will maintain adapt integrity. Allowing converged adapt cells to be modified will allow learning of any change to the system pressure error over time. Upon adapt modification, any portion of the integral that was not adapted shall be used when resetting the integral during the next loop of execution. The full integral term shall be passed for execution loops that do not modify the adapt table.

The summing routine 330 combines the proportional pressure command 312, the adapt correction term 327 and the remainder pressure command 329 to determine the final pressure command 335, and the remainder pressure command 329 is provided as feedback to the closed loop pulley pressure control routine 310. The final pressure command 335 is applied by the first actuator 55 to control an axial position of the first moveable sheave 52 of the first pulley 36 in response to the drive signal 53, or alternatively, is applied by the first actuator 55 to control an axial position of the second moveable sheave 64 of the second pulley 38 in response to the driven signal 63.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a continuously variable transmission (CVT) of a powertrain system, the method comprising:
    determining a target clamping pressure and an actual clamping pressure for a clamping pulley of the CVT;
    determining a proportional term and an integral term based upon the target clamping pressure and the actual clamping pressure;
    determining, via a controller, an adapt correction term based upon the target clamping pressure and a CVT temperature, wherein determining the adapt correction term based upon the target clamping pressure and the CVT temperature comprises selecting the adapt correction term from a plurality of adapt correction terms stored in a lookup table stored in a memory cache of the controller, wherein each of the plurality of adapt correction terms is associated with a clamping pressure range and a CVT temperature range;
    updating the selected adapt correction term stored in the lookup table associated with the target clamping pressure and the CVT temperature based upon the integral term for the target clamping pressure and the CVT temperature;
    determining a commanded clamping pressure for the clamping pulley based upon the proportional term, the integral term and the adapt correction term; and
    controlling, via the controller, a pressure command to drive an actuator of a moveable sheave of the clamping pulley based upon the commanded clamping pressure.

2. The method of claim 1, wherein updating the selected adapt correction term in the lookup table comprises updating the selected adapt correction term in the lookup table when the selected adapt correction term converges, wherein the selected adapt correction term converges when the actual clamping pressure is within a calibrated range of the commanded clamping pressure, and the proportional term and the integral term remain less than calibrated thresholds for a calibrated period of time.

3. The method of claim 2, further comprising predicting states of adapt correction terms stored in adjacent cells in the lookup table when the selected adapt correction term converges.

4. The method of claim 1, wherein the proportional term comprises a proportional pressure command determined based upon an arithmetic difference between the target clamping pressure and the actual clamping pressure.

5. A method for controlling a continuously variable transmission (CVT), the method comprising:
    determining, via a controller, a target clamping pressure for a clamping pulley to achieve a preferred speed ratio in the CVT in response to an output torque request;
    determining an actual clamping pressure for the clamping pulley;
    determining an adapt correction term based upon the target clamping pressure and a CVT temperature, wherein determining the adapt correction term based upon the target clamping pressure and the CVT temperature comprises selecting the adapt correction term from a plurality of adapt correction terms stored in a lookup table stored in a memory cache of the controller, wherein each of the plurality of adapt correction terms is associated with a clamping pressure range and a CVT temperature range;
    updating the selected adapt correction term stored in the lookup table associated with the target clamping pressure and the CVT temperature based upon the integral term for the target clamping pressure and the CVT temperature;
    determining a commanded clamping pressure for the clamping pulley based upon the adapt correction term; and
    controlling, via the controller, a pressure command to drive an actuator of a moveable sheave of the clamping pulley based upon the commanded clamping pressure.

6. The method of claim 5, wherein updating the selected adapt correction term in the lookup table comprises updating the selected adapt correction term in the lookup table when the selected adapt correction term converges.

7. The method of claim 6, further comprising determining a proportional term and an integral term based upon the target clamping pressure and the actual clamping pressure; and wherein the selected adapt correction term converges when the actual clamping pressure is within a calibrated range of the commanded clamping pressure, and the proportional term and the integral term remain less than calibrated thresholds for a calibrated period of time.

8. The method of claim 7, further comprising predicting states of adapt correction terms stored in adjacent cells in the lookup table when the selected adapt correction term converges.

9. The method of claim 5, wherein the proportional term comprises a proportional pressure command determined based upon an arithmetic difference between the target clamping pressure and the actual clamping pressure.

10. A continuously variable transmission (CVT), comprising:

a variator including a first pulley and a second pulley, the first and second pulleys rotatably coupled by a flexible continuous rotatable device, wherein the first pulley rotatably couples to an input member and the second pulley rotatably couples to an output member;

the first pulley including a moveable sheave that translates along a first axis relative to a stationary sheave in response to urging of a first actuator;

the second pulley including a moveable sheave that translates along a second axis relative to a stationary sheave in response to urging of a second actuator;

a controller, in communication with a first sensor configured to monitor a first speed associated with the first pulley and a second sensor configured to monitor a second speed associated with the second pulley, and operatively connected to the first and second actuators;

the controller including an instruction set, the instruction set executable to:

determine a target clamping pressure and an actual clamping pressure for the first pulley, wherein the first pulley operates as a clamping pulley;

determine a proportional term and an integral term based upon the target clamping pressure and the actual clamping pressure;

determine an adapt correction term based upon the target clamping pressure and a CVT temperature, wherein the instruction set of the controller selects the adapt correction term from a plurality of adapt correction terms stored in a lookup table stored in a memory cache of the controller;

update the selected adapt correction term stored in the lookup table associated with the target clamping pressure and the CVT temperature based upon the integral term for the target clamping pressure and the CVT temperature;

determine a commanded clamping pressure for the clamping pulley based upon the proportional term, the integral term and the adapt correction term; and control a pressure command to drive the first actuator coupled to the moveable sheave of the first pulley based upon the commanded clamping pressure.

11. The CVT of claim 10, wherein the controller updates the selected adapt correction term in the lookup table when the selected adapt correction term converges, wherein the selected adapt correction term converges when the actual clamping pressure is within a calibrated range of the commanded clamping pressure, and the proportional term and the integral term remain less than calibrated thresholds for a calibrated period of time.

12. The CVT of claim 11, wherein the controller predicts states of adapt correction terms stored in adjacent cells in the lookup table when the selected adapt correction term converges.

* * * * *